US010336468B2

(12) United States Patent
Lueder (10) Patent No.: US 10,336,468 B2
(45) Date of Patent: Jul. 2, 2019

(54) AIRCRAFT VERTICAL STABILIZER ILLUMINATION LIGHT UNIT AND METHOD OF OPERATING AN AIRCRAFT VERTICAL STABILIZER ILLUMINATION LIGHT UNIT

(71) Applicant: Goodrich Lighting Systems GmbH, Lippstadt (DE)

(72) Inventor: Sascha Lueder, Rietberg (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 382 days.

(21) Appl. No.: 15/183,828

(22) Filed: Jun. 16, 2016

(65) Prior Publication Data

US 2016/0368621 A1    Dec. 22, 2016

(30) Foreign Application Priority Data

Jun. 19, 2015 (EP) ..................... 15172851

(51) Int. Cl.
*B64D 47/06* (2006.01)
*B64C 5/02* (2006.01)
*B64C 5/16* (2006.01)
*B64D 45/00* (2006.01)

(52) U.S. Cl.
CPC ............ *B64D 47/06* (2013.01); *B64C 5/02* (2013.01); *B64C 5/16* (2013.01); *B64D 45/0005* (2013.01); *B64D 2203/00* (2013.01)

(58) Field of Classification Search
CPC ...... B64D 47/06; B64D 47/02; B64D 45/005; B64D 2203/00; B64C 5/02; B64C 5/16; F21V 23/0442; B63H 25/36; G03B 21/14
See application file for complete search history.

(56) References Cited

U.S. PATENT DOCUMENTS

| 8,337,059 B2 | 12/2012 | Barnett et al. |
| 8,651,664 B2 * | 2/2014 | Harvey ............... G03B 21/145 244/117 R |
| 8,933,819 B1 * | 1/2015 | Garrettson ............ B64D 45/00 340/945 |
| 8,956,023 B1 * | 2/2015 | Hessling Von Heimendahl ......... B64D 47/02 362/470 |
| 2010/0020557 A1 | 1/2010 | Mukai et al. |

(Continued)

FOREIGN PATENT DOCUMENTS

| EP | 2719625 A1 | 4/2014 |
| EP | 2784376 A2 | 10/2014 |

OTHER PUBLICATIONS

Extended European Search Report of the European Patent Office for International Application No. EP15172851.6, dated Nov. 27, 2015, 5 pages.

*Primary Examiner* — Tien Q Dinh
*Assistant Examiner* — Vicente Rodriguez
(74) *Attorney, Agent, or Firm* — Cantor Colburn LLP (57) ABSTRACT

An aircraft vertical stabilizer illumination light unit, configured for being arranged in a rotatable horizontal stabilizer of an aircraft and for being oriented towards a vertical stabilizer of the aircraft for illuminating the vertical stabilizer, includes an LED group, having a plurality of LEDs, and an optical system, having at least one optical element, the optical system being associated with the LED group for shaping an output light intensity distribution from the light emitted by the LED group.

20 Claims, 5 Drawing Sheets

(56) References Cited

U.S. PATENT DOCUMENTS

| | | | |
|---|---|---|---|
| 2011/0188257 A1* | 8/2011 | Sidler | B64D 47/02 362/470 |
| 2013/0048793 A1* | 2/2013 | Edmond | B64D 47/02 244/199.4 |
| 2015/0232198 A1* | 8/2015 | Seibt | B64D 47/02 362/470 |

* cited by examiner

AIRCRAFT VERTICAL STABILIZER ILLUMINATION LIGHT UNIT AND METHOD OF OPERATING AN AIRCRAFT VERTICAL STABILIZER ILLUMINATION LIGHT UNIT

FOREIGN PRIORITY

This application claims priority to European Patent Application No. 15 172 851.6 filed Jun. 19, 2015, the entire contents of which is incorporated herein by reference.

TECHNICAL FIELD

The present invention is in the field of exterior aircraft lighting. In particular, the present invention relates to light units for the illumination of the vertical stabilizer at the tail of an aircraft. Such light units are sometimes also referred to as logo lights.

BACKGROUND OF THE INVENTION

Large commercial aircraft have many different exterior lights. An exemplary group of exterior aircraft lights are lights for passive visibility, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights.

Light units for illuminating the vertical stabilizer at the tail of an aircraft have a number of purposes. First, they allow for an inspection of the vertical stabilizer in the dark, such as during an operational check of the rudder. Second, they allow for providing an indication of the extension of the aircraft in the dark, because the illuminated area is a good estimate of where the tail end of the aircraft is. Third, they help in identifying aircraft during the approach or during taxiing on the air field, because the vertical stabilizer commonly contains an airline logo. For this reason, the vertical stabilizer illumination light units are often also referred to as logo lights.

Figure 1:
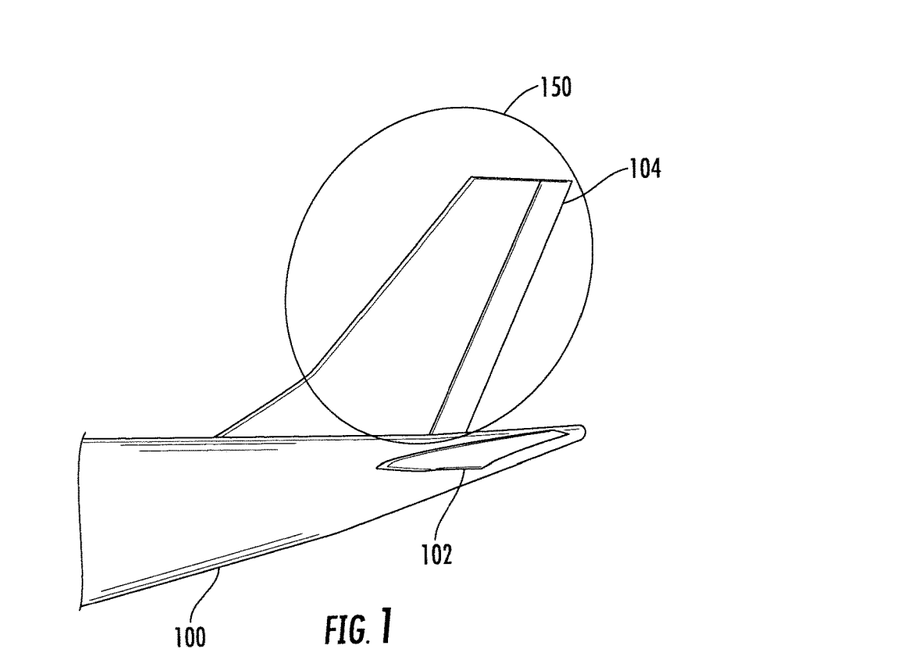
FIG. 1 shows an aircraft tail in a side view, with the vertical stabilizer being illuminated by a prior art light unit.

An exemplary tail of an aircraft 100 is shown in FIG. 1. The aircraft 100 has two horizontal stabilizers, one of them being shown in the viewing direction of FIG. 1 and being indicated with reference numeral 102. Further, the aircraft 100 has a vertical stabilizer 104, mounted to the top of the fuselage of the aircraft 100. The horizontal stabilizer 102 comprises a vertical stabilizer illumination light unit that emits light towards the vertical stabilizer 104 for illuminating the same. In FIG. 1, there is depicted a circle 150 that illustrates an illumination cone representing the area illuminated by a prior art vertical stabilizer illumination light unit. As can be seen from FIG. 1, the illumination cone 150 illuminates a large portion of the vertical stabilizer 104. However, it also emits a large amount of light that passes the vertical stabilizer 104 and is, therefore, not used for the illumination of the vertical stabilizer 104. In other words, such a prior art vertical stabilizer illumination light unit emits a large amount of "wasted" light.

Accordingly, it would be beneficial to provide an aircraft vertical stabilizer illumination light unit that has an improved light usage efficiency.

SUMMARY

Exemplary embodiments of the invention include an aircraft vertical stabilizer illumination light unit, configured for being arranged in a rotatable horizontal stabilizer of an aircraft and for being oriented towards a vertical stabilizer of the aircraft for illuminating the vertical stabilizer, comprising an LED group, comprising a plurality of LEDs, and an optical system, comprising at least one optical element, the optical system being associated with the LED group for shaping an output light intensity distribution from the light emitted by the LED group. The LED group and the optical system are stationary within the aircraft vertical stabilizer illumination light unit, with each LED of the LED group having a set position with respect to the optical system. At least some of the plurality of LEDs are independently controllable. The aircraft vertical stabilizer illumination light unit is configured to be operated in a plurality of operating modes, with a respective subset of the plurality of LEDs being switched on in each of the plurality of operating modes and with a different output light intensity distribution being emitted by the aircraft vertical stabilizer illumination light unit in each of the plurality of operating modes, with a selection of the operating mode being carried out in response to a rotation angle of the rotatable horizontal stabilizer.

Exemplary embodiments of the invention allow for a reduction of the waste light by making the output light intensity distribution of the aircraft vertical stabilizer illumination light unit dependent on the rotation angle of the horizontal stabilizer, to which the light unit is mounted during use in an aircraft. As compared to prior art approaches, which provided for such an output light intensity distribution that the vertical stabilizer was illuminated for all possible rotation angles of the horizontal stabilizer, the aircraft vertical stabilizer illumination light unit takes into account the rotation angle of the horizontal stabilizer and adjusts the output light intensity distribution as a response thereto. In this way, it can be ensured that the vertical stabilizer is fully illuminated, while at the same time reducing the waste light passing the vertical stabilizer and not illuminating the same. While the prior art has accounted for the rotation of the horizontal stabilizer, to which the light unit is mounted, by providing a wide output light intensity distribution, leading to a large amount of waste light, exemplary embodiments of the present invention adjust the output light intensity distribution as a response to the rotation angle of the horizontal stabilizer and are, thus, able to reduce the waste light. This in turn may lead to a reduced power consumption and/or to a higher lifetime and/or an optimized uniform illumination of the vertical stabilizer for different rotation angles of the horizontal stabilizer. In particular, via the plurality of operating modes, the illumination of the vertical stabilizer can be optimized individually for different rotation angles of the horizontal stabilizer, which are also referred to as trim angles.

The aircraft vertical stabilizer illumination light unit is very robust, because the LEDs and the optical system are stationary within the light unit. The plurality of operating modes are achieved via switching on/off different subsets of the plurality of LEDs. As compared to moving light sources and/or moving optical systems, this approach is beneficial, as it does not require mechanical actuators for adjusting the output light intensity distribution. The selection of a particular operating mode and the driving of the respective subset of the plurality of LEDs for the given operating mode is a purely electrical procedure, not relying on any mechanical actuation. This leads to a high reliability of the aircraft vertical stabilizer illumination light unit and, thus, to low maintenance requirements.

As stated above, at least some of the plurality of LEDs are independently controllable. This wording means that a more granular control of the LEDs is possible, as compared to a fully joint control of the plurality of LEDs. It is possible that each of the plurality of LEDs is individually controllable. However, it is also possible that some LEDs or some groups of LEDs are individually controllable, while other LEDs are jointly controllable. For example, it is possible that a particular subgroup of LEDs is operated in all of the operating modes. In this case, it is possible that they are only jointly controllable. However, at least some of the LEDs are operated in a particular operating mode/particular operating modes, while not being operated in other operating modes. Accordingly, at least these LEDs are controllable in an independent manner, as compared to the other LEDs.

According to a further embodiment, the aircraft vertical stabilizer illumination light unit is configured to carry out the selection of the operating mode in such a way that substantially the entire vertical stabilizer of the aircraft is illuminated for a given rotation angle of the rotatable horizontal stabilizer within a predefined rotation angle range. In other words, the light unit is able to select, for any given rotation angle of the horizontal stabilizer in a predefined rotation angle range, an operating mode and, thus, a respective subset of the plurality of LEDs whose light emission results in an output light intensity distribution that illuminates substantially the entire vertical stabilizer of the aircraft. In particular, the aircraft vertical stabilizer illumination light unit may comprise a control unit that selects a particular operating mode for a particular rotation angle of the horizontal stabilizer. The control unit may comprise a look-up table or an algorithm for selecting the operating mode in response to the rotation angle of the horizontal stabilizer. This look-up table/algorithm may contain the information which operating mode leads to a full illumination of the vertical stabilizer for which rotation angle.

According to a further embodiment, the predefined rotation angle range covers an angular range of at least 10°, in particular an angular range of between 10° and 20°. In this way, the aircraft vertical stabilizer illumination light unit is able to account for common rotation angles of horizontal stabilizer of large commercial aircraft. For example, the predefined rotation angle range may include rotation angles of between −14° and 4°. In another example, the predefined rotation angle range may include rotation angles of between −6° and 4°. In yet another example, the predefined rotation angle range may include rotation angles of between −10° and 2.5°.

According to a further embodiment, for each of the plurality of operating modes, the respective subset of the plurality of LEDs emits light illuminating a respective illumination sector of a vertical plane through the vertical stabilizer, with the respective illumination sector being less than 120%, in particular less than 110%, in area, as compared to the vertical stabilizer. In other words, for an imaginary vertical plane running through the vertical stabilizer of the aircraft, the illumination sector of any one of the plurality of operating modes has an extension that is less than 120%, in particular less than 110%, of the extension of the vertical stabilizer. In yet other words, the area of the illumination sector is less than 20%, in particular less than 10%, larger than the area of the vertical stabilizer. In this way, the vast majority of the light, leaving the aircraft vertical stabilizer illumination light unit, is actually used for illuminating the vertical stabilizer, with only a small portion of the emitted light passing the vertical stabilizer and not contributing to the illumination thereof.

According to a further embodiment, the respective illumination sector substantially corresponds in area to the vertical stabilizer. In other words, the area of the imaginary vertical plane illuminated by the aircraft vertical stabilizer illumination light unit is substantially the same as the area of the vertical stabilizer. In yet other words, substantially all of the light emitted by the aircraft vertical stabilizer illumination light unit reaches the vertical stabilizer and illuminates the same. In this way, the light usage efficiency is even further optimized.

According to a further embodiment, the plurality of operating modes comprises a reference operating mode for illuminating the vertical stabilizer with a reference output light intensity distribution, when the rotatable horizontal stabilizer is in a reference position, and a plurality of adjusted operating modes, having respective adjusted output light intensity distributions, wherein each of the adjusted output light intensity distributions compensates for a particular rotation of the aircraft vertical stabilizer illumination light unit. In this way, the vertical stabilizer may be illuminated in the reference operating mode, when the rotatable horizontal stabilizer is in its most common position, such as the position on the ground or a cruise flight position, while the adjusted operating modes may be used during flight phases that are commonly associated with extended rotations of the horizontal stabilizer, such as start and landing phases of the flight. The adjusted operating modes may have adjusted output light intensity distributions that lead to a very similar or even substantially the same illumination of the imaginary vertical plane through the vertical stabilizer, discussed above. In particular, the output light intensity distributions of the reference operating mode and the adjusted operating modes may have an overlap of more than 95% in the vertical plane through the vertical stabilizer, when the light unit is installed in the horizontal stabilizer and the adjusted operating modes are used at the respective particular rotations of the aircraft vertical stabilizer illumination light unit.

According to a further embodiment, each of the plurality of operating modes has a vertical light output opening angle, based on a height extension of the vertical stabilizer, and a horizontal light output opening angle, based on a length extension of the vertical stabilizer, with a combined horizontal light output opening angle of all of the plurality of operating modes being 5° to 20°, in particular 10° to 15°, larger than the horizontal light output opening angle of each one of the plurality of operating modes. In other words, the horizontal light output opening angles of the different operating modes are offset with respect to each other in the light unit frame of reference, i.e. the different operating modes have different output light intensity distributions that cover different horizontal sectors, as seen from the light unit. In this way, it can be achieved that the output light intensity distribution of the aircraft vertical stabilizer illumination light unit is similar or even the same in the aircraft frame of reference for the different operating modes, although the rotation of the horizontal stabilizers rotates the light unit in the aircraft frame of reference. The overall larger horizontal opening angle of the combined output light intensity distribution of all operating modes, as compared to the individual operating modes, allows for a selection of an appropriate operating mode that provides a horizontal opening angle that corresponds to the position of the vertical stabilizer for the given orientation of the light unit. The horizontal light output opening angles of the different operating modes may overlap.

The vertical light output opening angle and the horizontal light output opening angle may be dependent on the type of aircraft and on the mounting distance between the light unit and the vertical stabilizer. In particular, both the vertical light output opening angle and the horizontal light output opening angle of the operating modes may be chosen in dependence of the height extension of the vertical stabilizer, the length extension of the vertical stabilizer, and the distance between the light unit and the vertical stabilizer. The particular opening angles and the particular shapes of the output light intensity distributions may be reached on the basis of the geometric conditions present in a particular setting. The horizontal and vertical light output opening angles may be measured for a reference position. For example, the horizontal light output opening angle may be measured for a horizontal line extending through the center of the vertical stabilizer in a height-wise direction. For example, the vertical light output opening angle may be measured for a vertical line extending through the center of the vertical stabilizer in a length-wise direction. The terms vertical and horizontal refer to the vertical and horizontal directions, when the light unit is installed in an aircraft and the aircraft is stationary on the ground. In the light unit frame of reference, the vertical and horizontal light output opening angles are opening angles in two orthogonal planes, running through the light unit.

According to a further embodiment, for each of the plurality of operating modes, a vertical light opening angle is between 70° and 90°, in particular between 80° and 85°, and/or wherein, for each of the plurality of operating modes, a horizontal light opening angle is between 70° and 110°. In this way, the aircraft vertical stabilizer illumination light unit is able to illuminate the vertical stabilizer of common large commercial aircraft. The vertical and horizontal opening angles may be adapted to a particular type of aircraft, depending on the extensions of the vertical stabilizer and the distance between the aircraft vertical stabilizer illumination light unit and the vertical stabilizer.

According to a further embodiment, the aircraft vertical stabilizer illumination light unit has exactly one optical system, with all of the plurality of LEDs being associated with the exactly one optical system and with light output by the plurality of LEDs being affected differently by the exactly one optical system due to their different positioning with respect thereto. In this way, a high integration and low overall space requirements for the light unit can be achieved. The LEDs are all associated with the exactly one optical system, i.e. only one optical system is present that shapes the output light intensity distribution. Having different positions, each of the LEDs is affected differently by the optical system and, thus, contributes to the output light intensity in a different manner. By operating respective subsets of the LEDs, the different output light intensity distributions of the different operating modes can be achieved.

According to an alternative embodiment, the LED group comprises at least two LED sub-groups and the optical system comprises at least two optical sub-systems, with each LED sub-group forming an optical set with a respective optical sub-system and with each optical set being optically independent from the other optical sets. In this way, optical sets are provided that may be designed independently from each other. Each optical set may be optimized for a particular contribution to the output light intensity distribution. In this way, the output light intensity distributions may be the result of the combined operation of different optical sets, which may lead to a more optimized illumination of the vertical stabilizer across the different operating modes. This approach may lead to more degrees of freedom in the design of the light unit for a particular application. It is possible that the LED sub-groups consist of one LED. However, it is also possible that there are multiple optical sets, as described above, and that each or some of the multiple optical sets have several LEDs contained therein. In this way, an optimized compromise between highly accurate light output and low space requirements may be achieved.

According to a further embodiment, the aircraft vertical stabilizer illumination light unit comprises a rotation angle sensor configured to sense the rotation angle of the horizontal stabilizer. In this way, the aircraft vertical stabilizer illumination light unit is an independent system that can adjust the output light intensity distribution without requiring input data.

According to an alternative embodiment, the aircraft vertical stabilizer illumination light unit is configured to receive the rotation angle from an aircraft operation sensor and/or from an aircraft board computer. The aircraft vertical stabilizer illumination light unit may be configured to receive a rotation angle input signal that carries information about the momentary rotation angle of the horizontal stabilizer. The rotation angle input signal may be generated by the aircraft operation sensor and supplied directly to the light unit. It is also possible that the aircraft board computer supplies the rotation angle input signal to the light unit. In this case, it is possible that the rotation angle input signal contains the information about measurements of the momentary rotation angle of the horizontal stabilizer. However, it is also possible that the rotation angle input signal corresponds to the control signal that the aircraft board computer supplies to the horizontal stabilizer. The aircraft vertical stabilizer illumination light unit may be configured to deduce the rotation angle that the horizontal stabilizer will assume as a response to the control signal and may be configured to select an appropriate operating mode as a response thereto.

Exemplary embodiments of the invention further include an aircraft, having in a tail portion of the aircraft a vertical stabilizer, a left rotatable horizontal stabilizer and a right rotatable horizontal stabilizer, wherein each of the left rotatable horizontal stabilizer and the right rotatable horizontal stabilizer comprises an aircraft vertical stabilizer illumination light unit, as described in any of the embodiments above, oriented towards the vertical stabilizer for illumination thereof. In particular, each of the aircraft vertical stabilizer illumination light units may emit an output light intensity distribution that is generally transverse to the aircraft fuselage. In particular, the aircraft vertical stabilizer illumination light units may emit an output light intensity distribution that has a vertical opening angle and a horizontal opening angle around an output direction that is in a plane orthogonal to the longitudinal extension of the aircraft fuselage. It can also be said that the general orientation of the aircraft vertical stabilizer illumination light units may be in a plane orthogonal to the aircraft fuselage. The additional features, modifications and effects, described above with respect to the aircraft vertical stabilizer illumination light unit, are equally applicable to the aircraft and are explicitly disclosed herewith in the context of the aircraft.

Exemplary embodiments of the invention further include a method of operating an aircraft vertical stabilizer illumination light unit, installed in a rotatable horizontal stabilizer of an aircraft for illuminating a vertical stabilizer of the aircraft, the method comprising the steps of operating the aircraft vertical stabilizer illumination light unit in a reference operating mode, having a reference output light intensity distribution for illuminating substantially the entire vertical stabilizer, when the rotatable horizontal stabilizer is in a reference position, and operating the aircraft vertical stabilizer illumination light unit in one of a plurality of adjusted operating modes, each having an adjusted output light intensity distribution, as a response to the rotatable horizontal stabilizer being rotated from the reference position by a particular rotation angle, wherein each of the plurality of adjusted output light intensity distributions compensates for a respective particular rotation angle of the aircraft vertical stabilizer illumination light unit, such that substantially the entire vertical stabilizer is illuminated in each of the plurality of adjusted operating modes. This method allows for illuminating the vertical stabilizer irrespective of the rotation angle of the horizontal stabilizer, while a high light usage efficiency can be achieved at the same time. This may lead to low power consumption and/or a high lifetime of the light unit. The additional features, modifications and effects, described above with respect to the aircraft vertical stabilizer illumination light unit, are equally applicable to the method of operating an aircraft vertical stabilizer illumination light unit. Analogous method steps are explicitly disclosed herewith.

According to a further embodiment, the aircraft vertical stabilizer illumination light unit comprises a plurality of LEDs and the method comprises the step of switching on, for each of the reference operating mode and the plurality of adjusted operating modes, a respective subset of the plurality of LEDs for illuminating the vertical stabilizer.

According to a further embodiment, for each of the reference operating mode and the plurality of adjusted operating modes, the respective selected subset of the plurality of LEDs emits light illuminating a respective illumination sector of a vertical plane through the vertical stabilizer, with the respective illumination sector being less than 120%, in particular less than 110%, in area, as compared to the vertical stabilizer.

BRIEF DESCRIPTION OF DRAWINGS

Further exemplary embodiments of the invention are described with respect to the accompanying drawings, wherein.

DETAILED DESCRIPTION OF THE INVENTION

Figure 2:
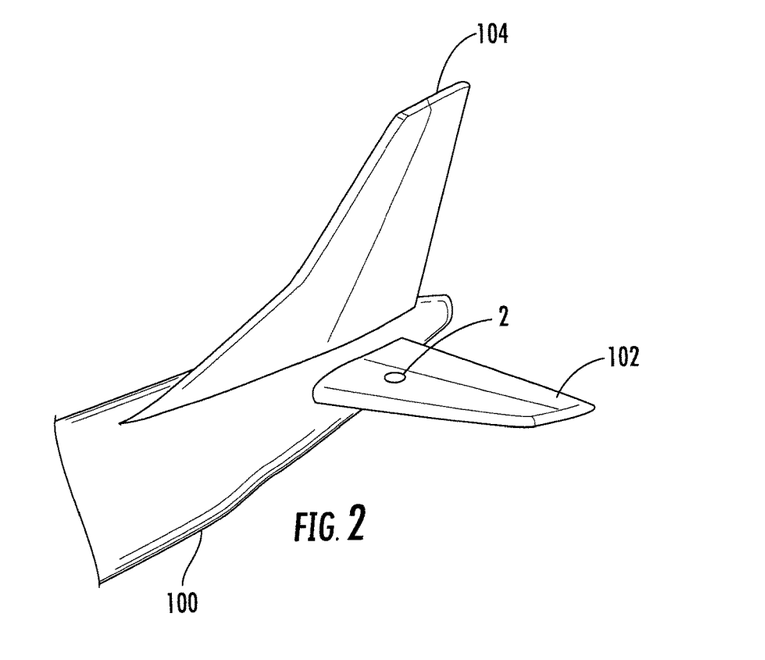
FIG. 2 shows an aircraft tail in a perspective view, with an aircraft vertical stabilizer illumination light unit in accordance with exemplary embodiments of the invention being arranged in the horizontal stabilizer.

FIG. 2 shows a tail portion of an aircraft 100 in a perspective view. In the perspective view of FIG. 2, a left rotatable horizontal stabilizer 102 and a vertical stabilizer 104 are shown, which are mounted to the fuselage of the aircraft 100. The left rotatable horizontal stabilizer 102 comprises an aircraft vertical stabilizer illumination light unit 2 in accordance with exemplary embodiments of the invention. The aircraft vertical stabilizer illumination light unit 2 is disposed on the upper side of the left rotatable horizontal stabilizer 102. It is arranged within the body of the left rotatable horizontal stabilizer 102 and has a cover lens that is flush with the upper surface of the left rotatable horizontal stabilizer 102. The aircraft vertical stabilizer illumination light unit 2 in operation emits light through the cover lens towards the vertical stabilizer 104 and illuminates the same. As will be explained in detail below, the aircraft vertical stabilizer illumination light unit 2 adjusts its output light intensity distribution as a response to a rotation of the left rotatable horizontal stabilizer 102.

Figure 3A:
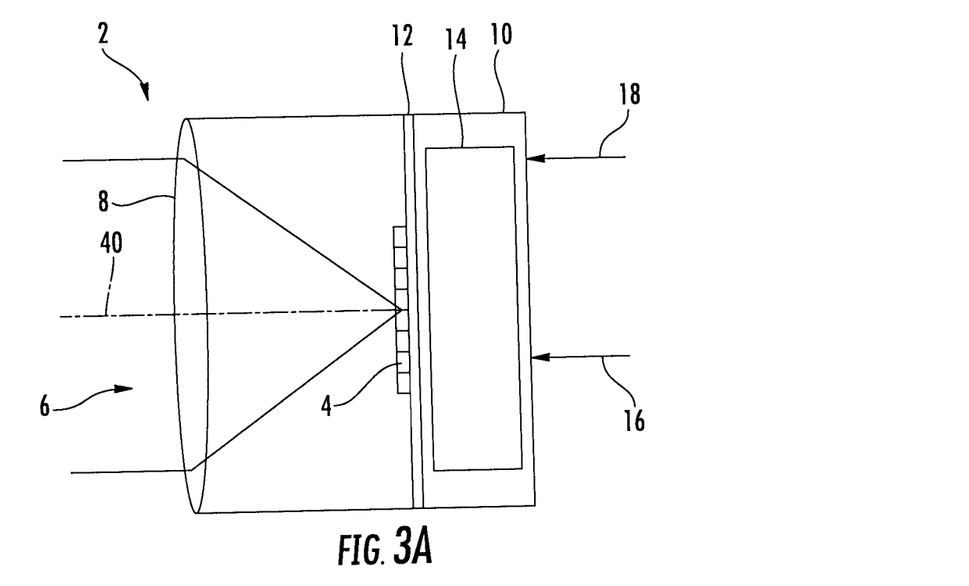
FIGS. 3a-3b shows schematics illustration of an aircraft vertical stabilizer illumination light unit in accordance with exemplary embodiments of the invention.

FIG. 3a shows a schematic illustration of an aircraft vertical stabilizer illumination light unit 2 in accordance with an exemplary embodiment of the invention. The aircraft vertical stabilizer illumination light unit 2 comprises a housing 10, whose inner space is separated into two parts by a mounting plate 12. Attached to the mounting plate 12, there is provided an LED group 4. The LED group 4 comprises a two-dimensional array of LEDs, one row of which is shown in the schematic illustration of FIG. 3a. The depicted row consists of eight individual LEDs arranged in a linear configuration in the exemplary embodiment. The aircraft vertical stabilizer illumination light unit 2 further comprises an optical system 6. In the exemplary embodiment of FIG. 3a, the optical system 6 consists of a lens 8. In operation, the LEDs of the LED group 4 emit light towards the lens 8 of the optical system 6.

On the other side of the mounting plate 12, there is provided a control unit 14. The control unit 14 is coupled to a power input 16 and to a rotation angle signal input 18. In this way, the control unit 14 receives power from an external power source, such as the aircraft power network, via the power input 16. It further receives a rotation angle signal via the rotation angle signal input 18, the rotation angle signal containing data that directly indicates or lets the control unit 14 deduce the rotation angle of the horizontal stabilizer, to which the aircraft vertical stabilizer illumination light unit is mounted. The rotation angle signal is provided to the aircraft vertical stabilizer illumination light unit 2 by an aircraft board computer in the exemplary embodiment of FIG. 3a. It is also possible that the aircraft vertical stabilizer illumination light unit 2 comprises a rotation angle sensor, which may be disposed in the housing 10. The rotation angle sensor may sense the rotation angle of the aircraft vertical stabilizer illumination light unit 2, and thus of the horizontal stabilizer, to which the aircraft vertical stabilizer illumination light unit 2 is mounted. The rotation angle sensor may be coupled to the control unit 14 and provide a rotation angle signal to the control unit 14.

The control unit 14 is further coupled to the LED group 4 and controls each of the LEDs of the LED group 4 individually. In particular, the control unit 14 is configured to selectively switch each of the LEDs of the LED group 4 on, depending on the operating mode that the control unit 14 determines appropriate for the present rotation angle of the horizontal stabilizer. The control unit 14 determines the appropriate operating mode on the basis of the rotation angle, as deduced from the information gained from the rotation angle signal, received at the rotation angle signal input 18. Further details of setting an appropriate operating mode will be described below.

Figure 3B:
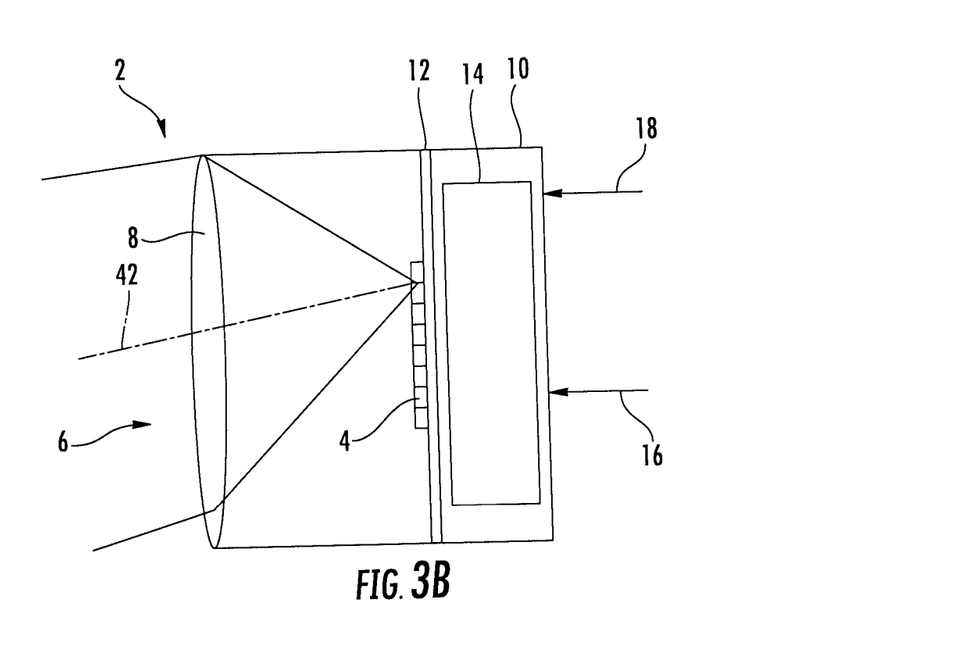

In FIG. 3a, a first illustrative operating mode of the aircraft vertical stabilizer illumination light unit 2 is shown. In the first illustrative operating mode, the two center LEDs of the shown portion of the LED group 4 are switched on, i.e. the two center LEDs emit light in the first illustrative operating mode. As can be seen from the depicted three exemplary light rays, the lens 8 substantially collimates the light emitted by the LEDs and outputs said light in a first main light emission direction 40. In FIG. 3b, a second illustrative operating mode of the aircraft vertical stabilizer illumination light unit 2 of FIG. 3a is shown. In particular, in the second illustrative operating mode, the top two LEDs of the shown portion of the LED group 4 are switched on. The light emitted by the two top LEDs of the LED group 4 is transformed into an output light intensity distribution of the second illustrative operating mode by the lens 8. As can be seen from the three depicted exemplary light rays, the light of the top two LEDs of the LED group 4 results in an output light intensity distribution that is angled somewhat towards the bottom in the drawing plane of FIG. 3b. The main light emission direction 42 of the output light intensity distribution of the second illustrative operating mode is slightly angled towards the bottom in the drawing plane of FIG. 3b.

From the comparison of FIG. 3a and FIG. 3b, it can be seen that each of the LEDs of the LED group 4 has a different contribution to the overall output light intensity distribution of the aircraft vertical stabilizer illumination light unit 2. It is apparent that a wide variety of output light intensity distributions can be achieved by operating different subsets of the LEDs of the LED group 4. Accordingly, various different operating modes of the aircraft vertical stabilizer illumination light unit 2 with different output light intensity distributions can be achieved by operating different subsets of LEDs.

The exemplary aircraft vertical stabilizer illumination light unit 2 of FIG. 3 is configured to have a plurality of operating modes, with the output light intensity distribution of each of the operating modes being such that the vertical stabilizer 104, depicted in FIG. 2, is illuminated in its entirety. The selection of the operating mode is carried out on the basis of the rotation angle of the horizontal stabilizer 102, as indicated via the rotation angle signal, received via the rotation angle signal input 18. Each of the operating modes has such an output light intensity distribution that the entire vertical stabilizer 104 is illuminated despite the rotation of the aircraft vertical stabilizer illumination light unit 2, as will be described with respect to FIG. 5. The selection of the particular operating mode compensates for the rotation of the aircraft vertical stabilizer illumination light unit 2.

The exemplary aircraft vertical stabilizer illumination light unit 2 is arranged in the horizontal stabilizer 102, depicted in FIG. 2, with the light being coupled out towards the vertical stabilizer 104 through a lens cover that is substantially flush with the upper surface of the horizontal stabilizer 102 for aerodynamic reasons. The lens cover of the aircraft vertical stabilizer illumination light unit 2, which is not shown in FIG. 3, may have a jagged inner structure in order to couple out a large portion of the light emitted by the LEDs. It is pointed out that it is also possible that that the inner surface of the lens cover is not jagged. The coupling out of the light and the orientation towards the vertical stabilizer 104 can also be achieved in other ways, e.g. via a suitable optical structure for re-directing the light.

Figure 4A:
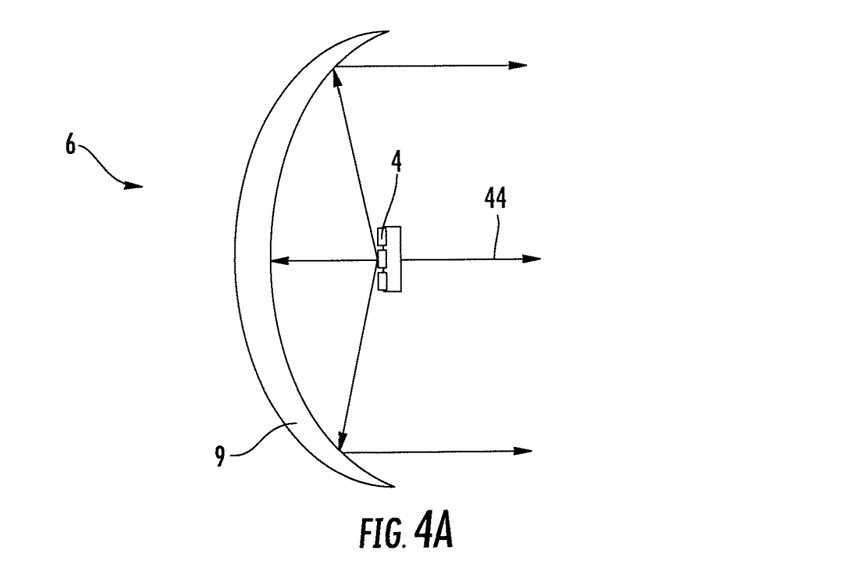
FIGS. 4a-4c show schematic illustrations of a combination of an LED group and an optical system, which can be used in an aircraft vertical stabilizer illumination light unit in accordance with exemplary embodiments of the invention.
Figure 4B:
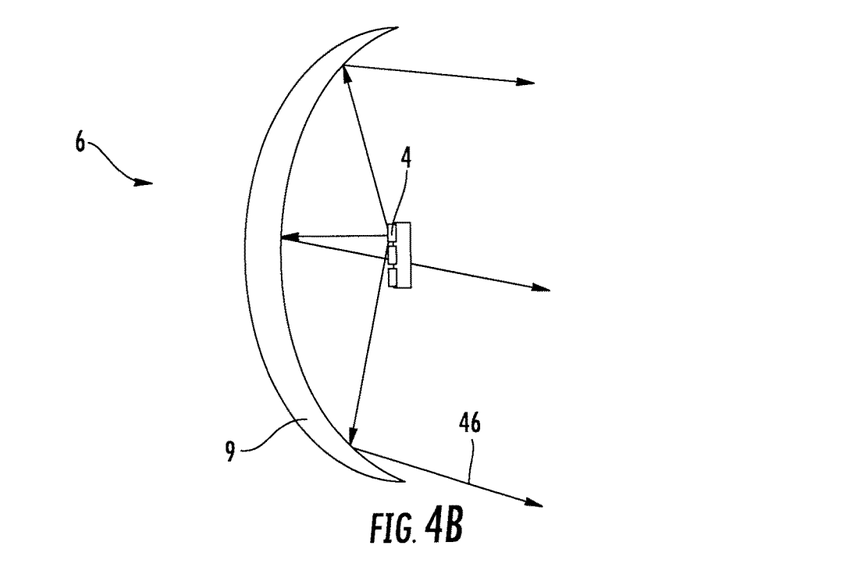
Figure 4C:
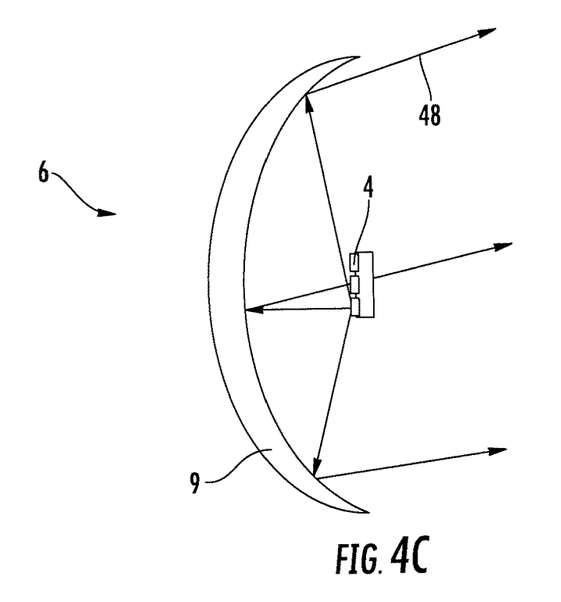

Referring to FIGS. 4a-4c shows a schematic illustration of an alternative combination of an optical system 6 and an LED group 4. This alternative combination is also able to achieve different output light intensity distributions for different operating modes and may thus also be used in aircraft vertical stabilizer illumination light units in accordance with exemplary embodiments of the invention.

FIG. 4a-4c, the optical system consists of a reflector 9, which is a collimating parabolic reflector in the exemplary embodiment of FIG. 4. The center LED of the LED group 4 is arranged in the focal point of the reflector 9, leading to a collimated output light intensity distribution in a direction 44 in a first illustrative operating mode (FIG. 4a), wherein the center LED is switched on. The top and bottom LEDs of the LED group 4 are arranged at a distance from the focal point of the reflector 9, such that the switching on of the top LED or of the bottom LED of the LED group 4 results in an illustrative output light intensity distribution that is angled towards the bottom (in a direction 46 in FIG. 4b) or angled towards the top (in a direction 48 in FIG. 4c) and has a somewhat wider, but still narrow opening angle.

Again, it can be seen that the selective switching of different LEDs of the LED group 4 leads to different contributions to the overall output light intensity distribution of the aircraft vertical stabilizer illumination light unit 2. It is again apparent that a wide variety of operating modes, having different output light intensity distributions, can be achieved via the switching of different subsets of LEDs.

It is pointed out that the optical system 6 may comprise multiple elements, that the optical system 6 may comprise a combination of one or more lenses and/or one or more reflectors, and that the lenses and reflectors may be non-collimating lenses and non-collimating reflectors, depending on the output light intensity distributions that are to be achieved in the different operating modes. It is further pointed out that larger numbers of operating modes may be achieved with larger numbers of LEDs, in particular with two-dimensional arrangements of LEDs having a large number of LEDs. The principles illustrates in FIGS. 3 and 4 may be extended to more complex LED arrangements within the aircraft vertical stabilizer illumination light unit 2.

It is further pointed out that the group of LEDs may comprise two or more sub-groups of LEDs, with each sub-group of LEDs having its own optical system associated therewith. For example, the aircraft vertical stabilizer illumination light unit 2 may have multiple optical sets, each optical set consisting of a lens 8 and a LEDs 4, as depicted in FIG. 3, or of a reflector 9 and LEDs 4, as depicted in FIG. 4. It is also possible that each LED of the group of LEDs has its own optical system associated therewith.

Figure 5A:
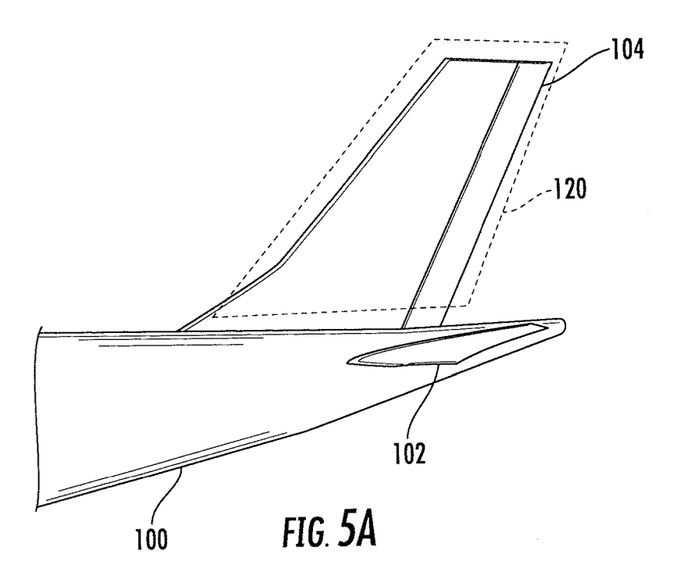
FIGS. 5a-5c show an aircraft tail in a side view, with the vertical stabilizer being illuminated by an aircraft vertical stabilizer illumination light unit in accordance with exemplary embodiments of the invention in three operating modes.
Figure 5B:
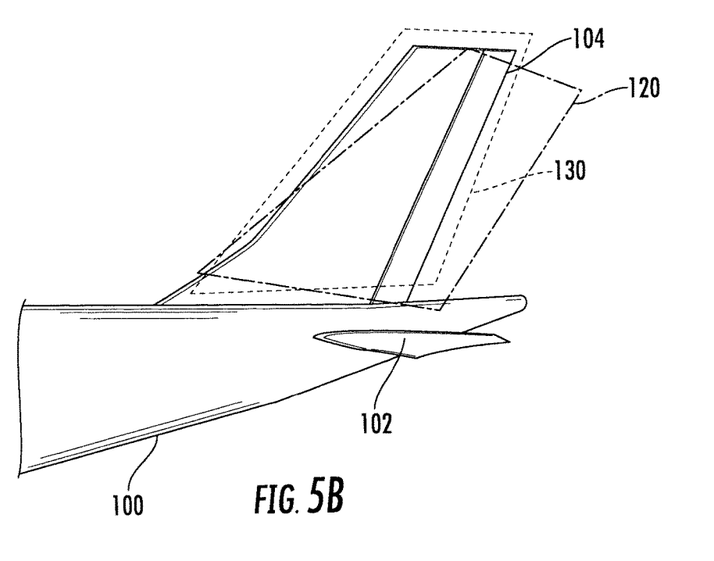
Figure 5C:
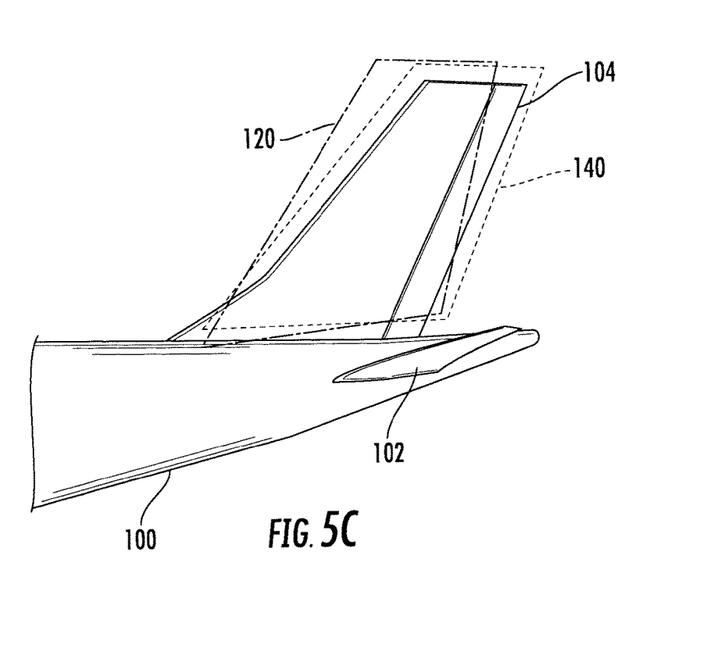

The operation of the exemplary aircraft vertical stabilizer illumination light unit 2, depicted in FIGS. 3 and 4, is now described with respect to FIG. 5. In FIG. 5, an aircraft tail is shown in a side view, similar to FIG. 1, with the vertical stabilizer 104 being illuminated by an aircraft vertical stabilizer illumination light unit 2 in accordance with an exemplary embodiment of the invention. The illumination is shown for three operating modes.

In FIG. 5a, the rotatable horizontal stabilizer 102 is shown in a reference position. In the exemplary embodiment of FIG. 5a, the reference position of the rotatable horizontal stabilizer 102 is the position that is used for the cruise flight of an aircraft at the cruise altitude. The rotation angle of the rotatable horizontal stabilizer 102 is defined to be 0° in the reference position. It is pointed out that another position of the rotatable horizontal stabilizer 102 can be defined as the reference position.

The aircraft vertical stabilizer illumination light unit 2 emits light in a first operating mode, also referred to as reference operating mode, when the horizontal stabilizer 102 is in the reference position. The area illuminated in the reference operating mode is indicated with a dashed line, indicated with reference numeral 120. It can also be said that reference numeral 120 refers to the output light intensity distribution of the reference operating mode, with the extension of the output light intensity distribution 120 being shown in comparison with the extension of the vertical stabilizer 104, i.e. with the output light intensity distribution being projected onto a vertical plane through the vertical stabilizer 104. The output light intensity distribution 120 illuminates substantially the entire vertical stabilizer 104 and extends somewhat beyond the front, top and aft edges of the vertical stabilizer 104.

In FIG. 5*b*, the horizontal stabilizer 102 is shown rotated towards the back of the aircraft 100. This rotation towards the back is defined as a positive rotation angle. As a response to this rotation angle of the horizontal stabilizer 102, the aircraft vertical stabilizer illumination light unit 2 selects a second operating mode, which results in a second output light intensity distribution 130, indicated with dashed lines and again projected onto the vertical plane through the vertical stabilizer 104. The second output light intensity distribution 130 again illuminates substantially the entire vertical stabilizer 104 and extends somewhat beyond the front, top and aft edges of the vertical stabilizer 104.

When looked at in the aircraft frame of reference, the illumination of the vertical stabilizer 104 via the second output light intensity distribution 130, depicted in FIG. 5*b* for the rotated horizontal stabilizer 102, is substantially the same as the illumination of the vertical stabilizer 104 via the first output light intensity distribution 120, depicted in FIG. 5*a* for the non-rotated horizontal stabilizer 102. In other words, the aircraft vertical stabilizer illumination light unit 2 adjusts its output light intensity distribution in such a way that it compensates for the rotation of the rotatable horizontal stabilizer 102 and in such a way that a continuing illumination of the vertical stabilizer 104 is achieved.

While the illumination of the vertical stabilizer 104 stays substantially the same, it is pointed out that the output light intensity distributions of the first and second operating modes are different in the light unit frame of reference. This is illustrated in FIG. 5*b* as follows. If the aircraft vertical stabilizer illumination light unit 2 were to be operated in the first operating mode and were to emit the first output light intensity distribution, although the horizontal stabilizer 102 is rotated towards the back of the aircraft, this first operating mode would lead to an illuminated area 120, depicted in dashed/dotted lines. As can be seen, the illuminated area 120 would only have a limited overlap with the vertical stabilizer 104. Accordingly, a large portion of the vertical stabilizer 104 would not be illuminated. In addition, a large portion of the light, which were emitted by the aircraft vertical stabilizer illumination light unit 2, when operated in the first operating mode, would pass the vertical stabilizer 104 and would not contribute to the illumination thereof. In particular, much of the emitted light would pass the vertical stabilizer 104 at its aft side.

The projection of the first output light intensity distribution onto the vertical plane of the vertical stabilizer, as depicted in FIG. 5*a* for the un-rotated horizontal stabilizer, is substantially the same as the projection of the second output light intensity distribution onto the vertical plane of the vertical stabilizer, as depicted in FIG. 5*b* for the rotated horizontal stabilizer. However, it is pointed out that these two projections may be different as well. In particular, different portions of the vertical stabilizer may be illuminated and/or different extensions of the illuminated area beyond the edges of the vertical stabilizer may be present in the different operating modes.

In FIG. 5*c*, the horizontal stabilizer 102 is shown rotated towards the front of the aircraft 100. This rotation towards the front is defined as a negative rotation angle. As a response to this rotation angle of the horizontal stabilizer 102, the aircraft vertical stabilizer illumination light unit 2 selects a third operating mode, which results in a third output light intensity distribution 140, indicated with dashed lines and again projected onto the vertical plane through the vertical stabilizer 104. The third output light intensity distribution 140 again illuminates substantially the entire vertical stabilizer 104 and extends somewhat beyond the front, top and aft edges of the vertical stabilizer 104.

Again, in order to illustrate the adjustment by the aircraft vertical stabilizer illumination light unit 2, the hypothetical case of the first operating mode being selected and the first output light intensity distribution 120 being emitted is shown in FIG. 5*c*. The projection of the first output light intensity distribution 120 onto the vertical plane through the vertical stabilizer is indicated via the dashed/dotted lines around the area illuminated by the first output light intensity distribution 120. It can again be seen that the adjusted output light intensity distribution illuminates substantially the entire vertical stabilizer 140, while a non-adjusted output light intensity distribution would leave a large portion of the vertical stabilizer 104 non-illuminated.

While three operating modes are shown and described with respect to FIGS. 5*a*, 5*b* and 5*c* for the purpose of illustration, the aircraft vertical stabilizer illumination light unit may have more operating modes. In other words, the aircraft vertical stabilizer illumination light unit may not only have a reference operating mode and one operating mode for a positive/negative rotation angle, as described with respect to FIGS. 5*a*, 5*b* and 5*c*. It may have multiple operating modes for both a variety of different positive rotation angles and a variety of different negative rotation angles. The response to the rotation angle of the horizontal stabilizer may have different levels of granularity, which may depend on the particular type of aircraft.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft vertical stabilizer illumination light unit, comprising:
   an LED group, comprising a plurality of LEDs, and
   an optical system, comprising at least one optical element, the optical system being associated with the LED group for shaping an output light intensity distribution from the light emitted by the LED group;
   wherein the unit is configured for being arranged in a rotatable horizontal stabilizer of an aircraft and for being oriented towards a vertical stabilizer of the aircraft for illuminating the vertical stabilizer;
   wherein the LED group and the optical system are stationary within the aircraft vertical stabilizer illumination light unit, with each LED of the LED group having a set position with respect to the optical system;

wherein at least some of the plurality of LEDs are independently controllable; and wherein the aircraft vertical stabilizer illumination light unit is configured to be operated in a plurality of operating modes, with a respective subset of the plurality of LEDs being switched on in each of the plurality of operating modes and with a different output light intensity distribution being emitted by the aircraft vertical stabilizer illumination light unit in each of the plurality of operating modes, with a selection of the operating mode being carried out in response to a rotation angle of the rotatable horizontal stabilizer.

2. The aircraft vertical stabilizer illumination light unit according to claim 1, wherein the aircraft vertical stabilizer illumination light unit is configured to carry out the selection of the operating mode in such a way that substantially the entire vertical stabilizer of the aircraft is illuminated for a given rotation angle of the rotatable horizontal stabilizer within a predefined rotation angle range.

3. The aircraft vertical stabilizer illumination light unit according to claim 2, wherein the predefined rotation angle range covers an angular range of at least 10°.

4. The aircraft vertical stabilizer illumination light unit according to claim 1, wherein, for each of the plurality of operating modes, the respective subset of the plurality of LEDs emits light illuminating a respective illumination sector of a vertical plane through the vertical stabilizer, with the respective illumination sector being less than 120% in area, as compared to the vertical stabilizer.

5. The aircraft vertical stabilizer illumination light unit according to claim 4, wherein the respective illumination sector substantially corresponds in area to the vertical stabilizer.

6. The aircraft vertical stabilizer illumination light unit claim 1, wherein the plurality of operating modes comprises a reference operating mode for illuminating the vertical stabilizer with a reference output light intensity distribution, when the rotatable horizontal stabilizer is in a reference position, and a plurality of adjusted operating modes, having respective adjusted output light intensity distributions, wherein each of the adjusted output light intensity distributions compensates for a particular rotation of the aircraft vertical stabilizer illumination light unit.

7. The aircraft vertical stabilizer illumination light unit according to claim 1, wherein each of the plurality of operating modes has a vertical light output opening angle, based on a height extension of the vertical stabilizer, and a horizontal light output opening angle, based on a length extension of the vertical stabilizer, with a combined horizontal light output opening angle of all of the plurality of operating modes being 5° to 20° larger than the horizontal light output opening angle of each one of the plurality of operating modes.

8. The aircraft vertical stabilizer illumination light unit according to claim 1, wherein, for each of the plurality of operating modes, a vertical light opening angle is between 70° and 90°.

9. The aircraft vertical stabilizer illumination light unit according to claim 1, having exactly one optical system, with all of the plurality of LEDs being associated with the exactly one optical system and with light output by the plurality of LEDs being affected differently by the exactly one optical system due to their different positioning with respect thereto.

10. The aircraft vertical stabilizer illumination light unit according to any of claim 8, wherein the LED group comprises at least two LED sub-groups and wherein the optical system comprises at least two optical sub-systems, with each LED sub-group forming an optical set with a respective optical sub-system and with each optical set being optically independent from the other optical sets.

11. The aircraft vertical stabilizer illumination light unit according to claim 1,
wherein the aircraft vertical stabilizer illumination light unit comprises a rotation angle sensor configured to sense the rotation angle of the horizontal stabilizer.

12. An aircraft having in a tail portion of the aircraft a vertical stabilizer, a left rotatable horizontal stabilizer and a right rotatable horizontal stabilizer,
wherein each of the left rotatable horizontal stabilizer and the right rotatable horizontal stabilizer comprises an aircraft vertical stabilizer illumination light unit according to claim 1, oriented towards the vertical stabilizer for illumination thereof.

13. A method of operating an aircraft vertical stabilizer illumination light unit, installed in a rotatable horizontal stabilizer of an aircraft for illuminating a vertical stabilizer of the aircraft, the method comprising the steps of:
operating the aircraft vertical stabilizer illumination light unit in a reference operating mode, having a reference output light intensity distribution for illuminating substantially the entire vertical stabilizer, when the rotatable horizontal stabilizer is in a reference position, and
operating the aircraft vertical stabilizer illumination light unit in one of a plurality of adjusted operating modes, each having an adjusted output light intensity distribution, as a response to the rotatable horizontal stabilizer being rotated from the reference position by a particular rotation angle,
wherein each of the plurality of adjusted output light intensity distributions compensates for a respective particular rotation angle of the aircraft vertical stabilizer illumination light unit, such that substantially the entire vertical stabilizer is illuminated in each of the plurality of adjusted operating modes.

14. The method according to claim 13, wherein the aircraft vertical stabilizer illumination light unit comprises an LED group having a plurality of LEDs and wherein the method comprises the step of switching on, for each of the reference operating mode and the plurality of adjusted operating modes, a respective subset of the plurality of LEDs for illuminating the vertical stabilizer.

15. The method according to claim 14, wherein, for each of the reference operating mode and the plurality of adjusted operating modes, the respective selected subset of the plurality of LEDs emits light illuminating a respective illumination sector of a vertical plane through the vertical stabilizer, with the respective illumination sector being less than 120% in area, as compared to the vertical stabilizer.

16. The aircraft vertical stabilizer illumination light unit according to claim 2, wherein the predefined rotation angle range covers an angular range of between 10° and 20°.

17. The aircraft vertical stabilizer illumination light unit according to claim 1, wherein each of the plurality of operating modes has a vertical light output opening angle, based on a height extension of the vertical stabilizer, and a horizontal light output opening angle, based on a length extension of the vertical stabilizer, with a combined horizontal light output opening angle of all of the plurality of operating modes being 10° to 15° larger than the horizontal light output opening angle of each one of the plurality of operating modes.

18. The aircraft vertical stabilizer illumination light unit according to claim 1, wherein, for each of the plurality of operating modes, a horizontal light opening angle is between 70° and 110°.

19. The aircraft vertical stabilizer illumination light unit according to claim 1, wherein, for each of the plurality of operating modes, a vertical light opening angle is between 70° and 90° and wherein, for each of the plurality of operating modes, a horizontal light opening angle is between 70° and 110°.

20. The aircraft vertical stabilizer illumination light unit according to claim 1,
   wherein the aircraft vertical stabilizer illumination light unit is configured to receive the rotation angle from at least one of an aircraft operation sensor and an aircraft board computer.

\* \* \* \* \*